United States Patent [19]
McLean et al.

[11] Patent Number: 5,329,675
[45] Date of Patent: Jul. 19, 1994

[54] CARABINER WITH THUMB GRIP

[75] Inventors: Andrew McLean, Park City; John Bercaw, Salt Lake City; Charles Brainerd, Salt Lake City; Jonny Woodward, Salt Lake City, all of Utah

[73] Assignee: Black Diamond Equipment, Ltd., Salt Lake City, Utah

[21] Appl. No.: 931,710

[22] Filed: Aug. 17, 1992

[51] Int. Cl.$^5$ .............................................. F16B 45/02
[52] U.S. Cl. ................................... 24/599.6; 24/573.5
[58] Field of Search ................ 24/599.6, 599.7, 599.8, 24/573.5, 598.2

[56] References Cited

U.S. PATENT DOCUMENTS 4,835,823  6/1989  Contat .............................. 24/573.5

FOREIGN PATENT DOCUMENTS 1518783  3/1968  France ............................... 24/573.5
8702029  3/1989  Netherlands ....................... 24/573.5

Primary Examiner—James R. Brittain
Attorney, Agent, or Firm—Thorpe, North & Western

[57] ABSTRACT

A carabiner includes an elongate extension formed generally into a prolate loop having a curved spine with an upper end and a lower end, an upper finger extending forwardly and downwardly from the upper end of the spine to terminate in a free end, a lower finger extending forwardly and upwardly in the shape of a hook to terminate in a free end, and an elongate pivot finger pivotally attached at a lower end to the free end of the lower finger to pivot between a closed position, in which an upper end of the pivot finger contacts the free end of the upper finger, and an open position, in which the upper end of the pivot finger is pivoted away from the free end of the upper finger toward the spine. The spine includes a fin or rib extending rearwardly therefrom, with the fin having a contact surface against which a person's thumb may rest when gripping the spine from the rear. This allows the person to orient, by feel, the carabiner for subsequent use.

6 Claims, 1 Drawing Sheet

U.S. Patent     July 19, 1994     5,329,675
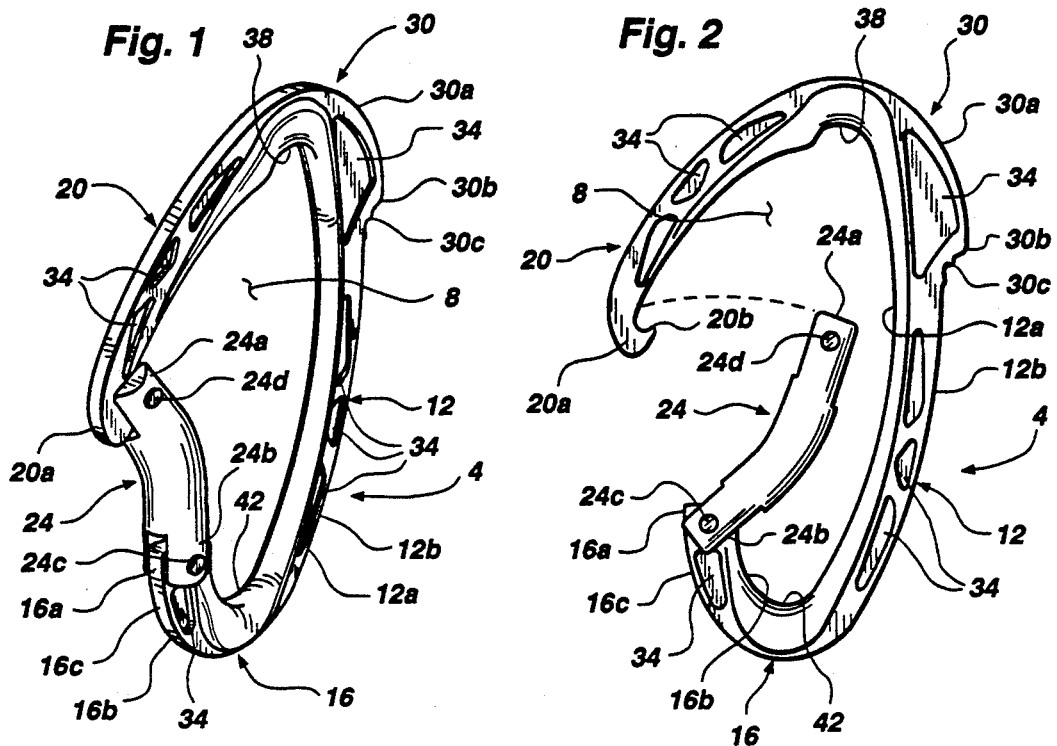
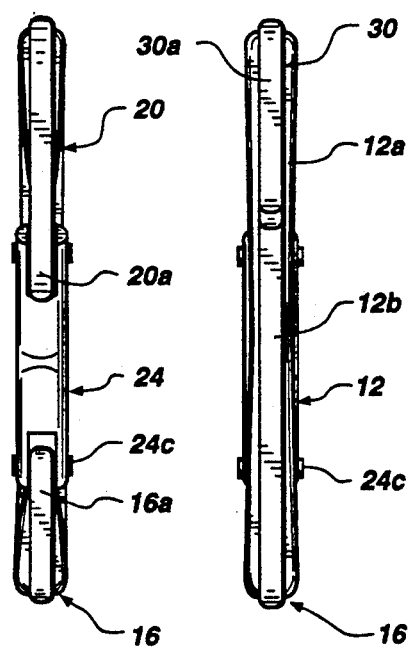
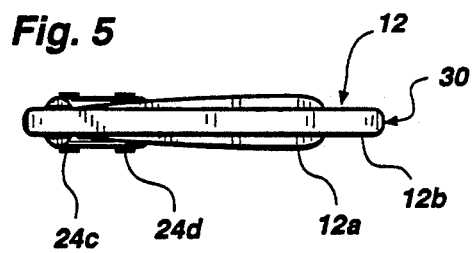
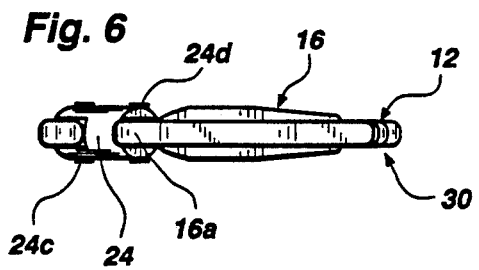

CARABINER WITH THUMB GRIP

BACKGROUND OF THE INVENTION

This invention relates to a carabiner designed to facilitate easy grasping and positioning for use.

Carabiners are a basic tool in the equipment of a climber, and are used to clip ropes, protection, and the like together in a variety of configurations. Oftentimes, it is necessary for the climber to retrieve a carabiner from a sling, orient it in his hand, and then clip a climbing rope or ropes into the body of the carabiner, all without being able to look at the carabiner, or rope or ropes.

With conventional carabiners, it is difficult, through feel alone, to be able to properly orient the carabiner for easy clipping of ropes thereinto. Of course, if the climber is required to look at the carabiner while using it, he may be distracted from other critical climbing activities.

Carabiners, as with other climbing equipment, should be lightweight and yet strong enough to safely serve all functions to which they might be put. In addition, the larger the central opening or void in the carabiner, the easier it is to insert fingers into the opening for better positioning.

SUMMARY OF THE INVENTION

It is an object of the invention to provide a new and improved carabiner.

It is another object of the invention to provide a carabiner which may be more easily grasped and oriented for clipping onto to ropes and other climbing equipment.

It is a further object of the invention to provide a carabiner which is light in weight, sturdy, and large enough to accommodate insertion of multiple fingers and ropes into the opening of the carabiner.

These and other objects of the invention are realized in a specific illustrative embodiment of a carabiner which includes an arcuate spine having a concave front side and a convex back side, a fin disposed to extend outwardly from the back side of the spine at a location near the upper end thereof, a foot section extending from the lower end of the spine forwardly and upwardly to a termination, and a nose section extending forwardly and downwardly from the upper end of the spine to a termination located forwardly and above the termination of the front section. A gate is mounted at a lower end to the termination of the foot section to pivot between a closed position, in which an upper end of the gate is in contact with termination of the nose section, and an open position, in which the open end of the gate is pivoted away from the termination of the nose section toward the spine. The fin includes a contact surface which faces outwardly and downwardly toward the lower end of the spine for contacting by a person's thumb when the person is gripping the spine or otherwise holding the carabiner. The fin both makes it easier to grip and hold the carabiner and allows the climber to readily recognize the orientation of the carabiner by touch.

BRIEF DESCRIPTION OF THE DRAWINGS

The above and other objects, features and advantages of the invention will become apparent from a consideration of the following detailed description presented in connection with the accompanying drawings in which:

FIG. 1 is a perspective view of a carabiner made in accordance with the principles of the present invention;

FIG. 2 is a side, elevational view of the carabiner of FIG. 1;

FIG. 3 is a front view of the carabiner of FIG. 1;

FIG. 4 is a rear view of the carabiner of FIG. 1;

FIG. 5 is a top plan view of the carabiner of FIG. 1; and

FIG. 6 is a bottom view of the carabiner of FIG. 1.

DETAILED DESCRIPTION

Referring to the drawings, there is shown a carabiner 4 formed generally into a prolate loop circumscribing an opening or void 8. The carabiner 4 includes an arcuate spine 12 having a concave front 12a and a convex back 12b. The front 12a of the spine is enlarged to have a greater width than the back 12b, as best seen in FIGS. 4 and 5.

Extending forwardly and upwardly from the lower end of the spine 12 is a hook-shaped tail 16. The tail 16 terminates at a free end 16a positioned in front of the spine 12. The tail 16, as with the spine 12, has an enlarged side 16b and a narrower side 16c.

Extending forwardly and downwardly from the upper end of the spine 12 is a finger-like nose section 20. The nose section 20 extends forwardly beyond the free end 16 of the tail 16 to terminate in a free end 20a. The free end 20a of the nose section 20 is formed into a hook 20b in a conventional fashion to receive the free end 24a of an elongate gate 24. The other or pivot end 24b of the gate 24 is pivotally mounted by a pin 24c to the free end 16a of the tail 16, as shown. The gate 24 may thus pivot between a closed position, in which the free end 24a of the gate is in contact with the free end 20a of the nose section 20, and an open position, in which the free end 24a of the gate is moved or pivoted away from the free end 20a of the nose section 20, toward the spine 12, as best seen in FIG. 2. The free end 24a of the gate 24 is formed into a fork and includes a pin 24d which extends through the fork and which makes contact with the free end 20a of the nose section 20 when the gate is in the closed position. (The pivot end 24b of the gate 24 is also formed into a fork for receiving the free end 16a of the tail 16, all in a conventional fashion.)

Protruding from the convex back side of the spine 12 is a fin or rib 30 disposed near the top of the spine. The fin 30 includes an upper portion or surface 30a which extends from the upper end of the spine 12 gradually outwardly and downwardly to a point 30b. A contact surface 30c is then formed to extend from the point 30b abruptly inwardly back to the spine 12, as best seen in FIGS. 1 and 2. The surface 30c of the fin 30 includes serrations to inhibit slipping of a finger or, more likely, thumb from off the surface.

Formed at various locations in the spine 12, tail 16 and nose section 20, on both sides thereof, are pockets or indentations 34 which function to lighten the overall weight of the carabiner. These pockets or indentations are placed at the narrower portions of the respective, spine, tail and nose section, as shown. Although multiple pockets are shown in the spine 12 and nose section 20, a single pocket could also be provided in each part with similar effect.

The carabiner parts are dimensioned to enable insertion into the opening 8 of three typical adult fingers, along with a climbing rope which would be positioned against an inside surface 38 located between the spine 12 and nose section 20 (FIGS. 1 and 2). In particular, the three fingers would be positioned in grasping position about the spine 12, at the lower end thereof and below the location of the rope, and the thumb could be placed in contact with contact surface 30c to stabilize and secure the gripping and positioning of the carabiner. Also, provision of the fin 30 allows the climber to feel and locate the fin and thus recognize, without viewing, the orientation of the fin in the climber's hand. The climber can then quickly and accurately clip the carabiner onto climbing ropes or other climbing equipment without looking at the carabiner or the equipment. Although the natural gripping position of the carabiner would be to wrap the fingers about the spine 12 and place the thumb against the contact surface 30c of the fin 30, it should be evident that even with other gripping or grasping configurations, the fin 30 would aid in allowing the climber to orient and position the carabiner without having to look at it.

Suitable dimensions for the carabiner to accomplish the objectives of the present invention are a spine height of about 4.5 inches, a height for the opening 8 from an inside surface 42 of the tail 16 to the surface 38 of about 3.7 inches, and a width of the opening 8 from the free end 20a of the nose section 20 to the inside, concave surface of the spine 12 of about two inches.

The gate 24 is bent to present a concave outer surface and a convex inner surface, as best seen in FIGS. 1 and 2, to facilitate easier clipping of the carabiner onto a rope, since a simple pressing of the carabiner, and the gate 24 in particular, against a rope will cause the rope to rest in the concave surface of the gate to push and therefore open the gate allowing the rope to enter the opening 8.

In the manner described, a versatile, easy-to-handle and yet lightweight carabiner is provided. The fin 30 on the spine 12 allows the climber to readily orient the carabiner by "feel" to allow clipping onto a rope or other climbing equipment. The dimensions of the carabiner also allow for a more firm and secure gripping of the carabiner.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A carabiner comprising:

an arcuate spine having a concave front side, convex back side, upper end, and lower end, a fin disposed to extend outwardly from the back side of the spine at a location near the upper end thereof, said fin having a contact surface which faces outwardly and downwardly toward the lower end of the spine, said contact surface including serrations formed therein, a tail section extending from the lower end of the spine forwardly and upwardly to a termination, a nose section extending forwardly and downwardly from the upper end of the spine to a termination located forwardly and above the termination of the tail section, and elongate gate means mounted at a lower end to the termination of the tail section, to pivot between a closed position, in which an upper end of the gate means is in contact with the termination of the nose section, and an open position, in which the upper end of the gate means is pivoted away from the termination of the nose section toward the spine.

2. A carabiner as in claim 1 wherein said gate means, when in the closed position, extends upwardly from the termination of the tail section and then upwardly and outwardly toward and in contact with the termination of the nose section.

3. A carabiner as in claim 1 wherein the spine, tail section and nose section include one or more pockets formed on opposite sides thereof to lighten the weight of the carabiner.

4. A carabiner as in claim 1 wherein the spine, tail section, nose section and gate means are disposed to circumscribe a central opening having a dimension suitable for receiving three fingers of a person, for grasping the spine, and a rope.

5. A carabiner as in claim 4 wherein the spine is about 4.5 inches in height, wherein the height of the opening from the tail section to the nose section is about 3.7 inches, and wherein the width of the opening from the front side of the spine to the termination of the nose section is about 2 inches.

6. A carabiner comprising an elongate extension formed generally into a prolate loop having a curved spine with an upper end and a lower end, an upper finger extending forwardly and downwardly from the upper end of the spine to terminate in a free end, a lower finger extending forwardly and upwardly in the shape of a hook to terminate in a free end, an elongate pivot finger pivotally attached at a lower end to the free end of the lower finger to pivot between a closed position, in which an upper end of the pivot finger contacts the free end of the upper finger, and an open position, in which the upper end of the pivot finger is pivoted away from the free end of the upper finger toward the spine, and wherein said spine includes a rib extending rearwardly from the spine, said rib having a contact surface against which a person's thumb may rest when gripping the spine from the rear, wherein said contact surface includes serrations.

* * * * *